United States Patent
Kortuem

(10) Patent No.: US 6,840,523 B2
(45) Date of Patent: Jan. 11, 2005

(54) DOG-POWERED VEHICLE

(76) Inventor: Philip J. Kortuem, 24073-610th Ave., Madison Lake, MN (US) 56063

(*) Notice: Subject to any disclaimer, the term of this patent is extended or adjusted under 35 U.S.C. 154(b) by 10 days.

(21) Appl. No.: 10/271,918

(22) Filed: Oct. 16, 2002

(65) Prior Publication Data

US 2004/0075226 A1 Apr. 22, 2004

(51) Int. Cl.$^7$ .............................................. B62M 27/00
(52) U.S. Cl. ...................... 280/7.12; 280/14.28; 280/24; 280/845
(58) Field of Search ................................ 280/845, 7.13, 280/63, 7.14, 15, 16, 17, 87.043, 7.12, 21.1, 22, 22.1, 14.27, 14.28

(56) References Cited

U.S. PATENT DOCUMENTS

| | | | | | |
|---|---|---|---|---|---|
| 317,066 | A | * | 5/1885 | Wood | 280/63 |
| 469,507 | A | * | 2/1892 | Spencer | 280/62 |
| 1,239,196 | A | * | 9/1917 | Lundquist | 280/7.12 |
| 1,711,418 | A | * | 4/1929 | Linden | 280/87.043 |
| 1,744,654 | A | * | 1/1930 | Lorenzen | 280/47.131 |
| 1,755,299 | A | * | 4/1930 | Linden | 280/87.043 |
| 2,096,893 | A | * | 10/1937 | Gilbert | 280/14.27 |
| 3,429,582 | A | * | 2/1969 | Embry | 280/7.12 |
| 3,779,572 | A | * | 12/1973 | Cheney | 280/21.1 |
| 3,944,243 | A | * | 3/1976 | Yates | 280/63 |
| D249,086 | S | * | 8/1978 | Tancredi | D21/428 |
| 4,470,610 | A | * | 9/1984 | Wilson | 280/47.25 |
| 4,671,522 | A | * | 6/1987 | Fragione, Jr. | 280/47.25 |
| 4,861,052 | A | * | 8/1989 | Hediger | 280/87.043 |
| D316,988 | S | * | 5/1991 | McCrary | D12/129 |
| 5,205,570 | A | * | 4/1993 | Brown | 280/24 |
| 5,433,458 | A | * | 7/1995 | Kampe | 280/14.28 |
| 5,470,093 | A | * | 11/1995 | Kiser | 280/304.1 |

OTHER PUBLICATIONS

Black Ice Dog Sledding Equipment Catalog (2000–2001 Sledding Season).

* cited by examiner

Primary Examiner—Christopher P. Ellis
Assistant Examiner—Kelly E. Campbell

(57) ABSTRACT

A dog powered and human controlled vehicle comprising a frame structure having a horizontally oriented opening within which will be positioned at least one dog. The frame structure comprises a pair of frame members transversely spaced apart by forward and rearward transversely extending means. The front of the frame is supported by means which includes a steerable member adapted to have contact with the ground. The rear end of the frame is supported by means adapted to have contact with the ground, the frame structure being thus supported a preselected distance from the ground. Manually operable steering means are provided at the rear end of the structure and is connected to a steerable member at the front end so as to change direction of travel of the vehicle. Means are provided for tethering a dog to the frame structure and for connecting a dog harness on a dog to the frame structure so that forward directed longitudinal pulling force produced by the dog is applied to the frame structure. The vehicle may be steered to rotate about a vertical axis by manual actuation of the steering means at the rear end of the vehicle to operate the steerable member at the front end of the vehicle.

19 Claims, 5 Drawing Sheets

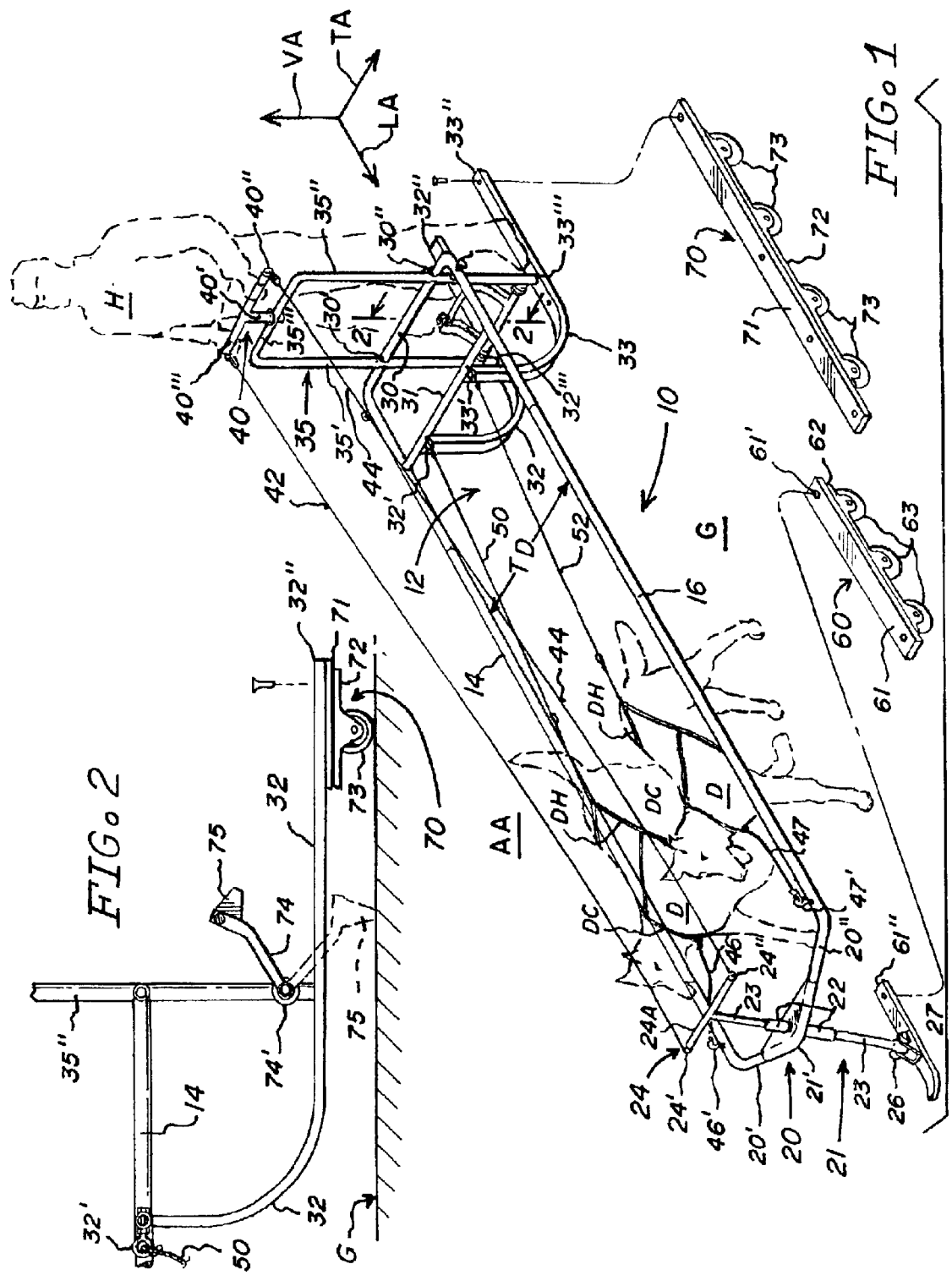

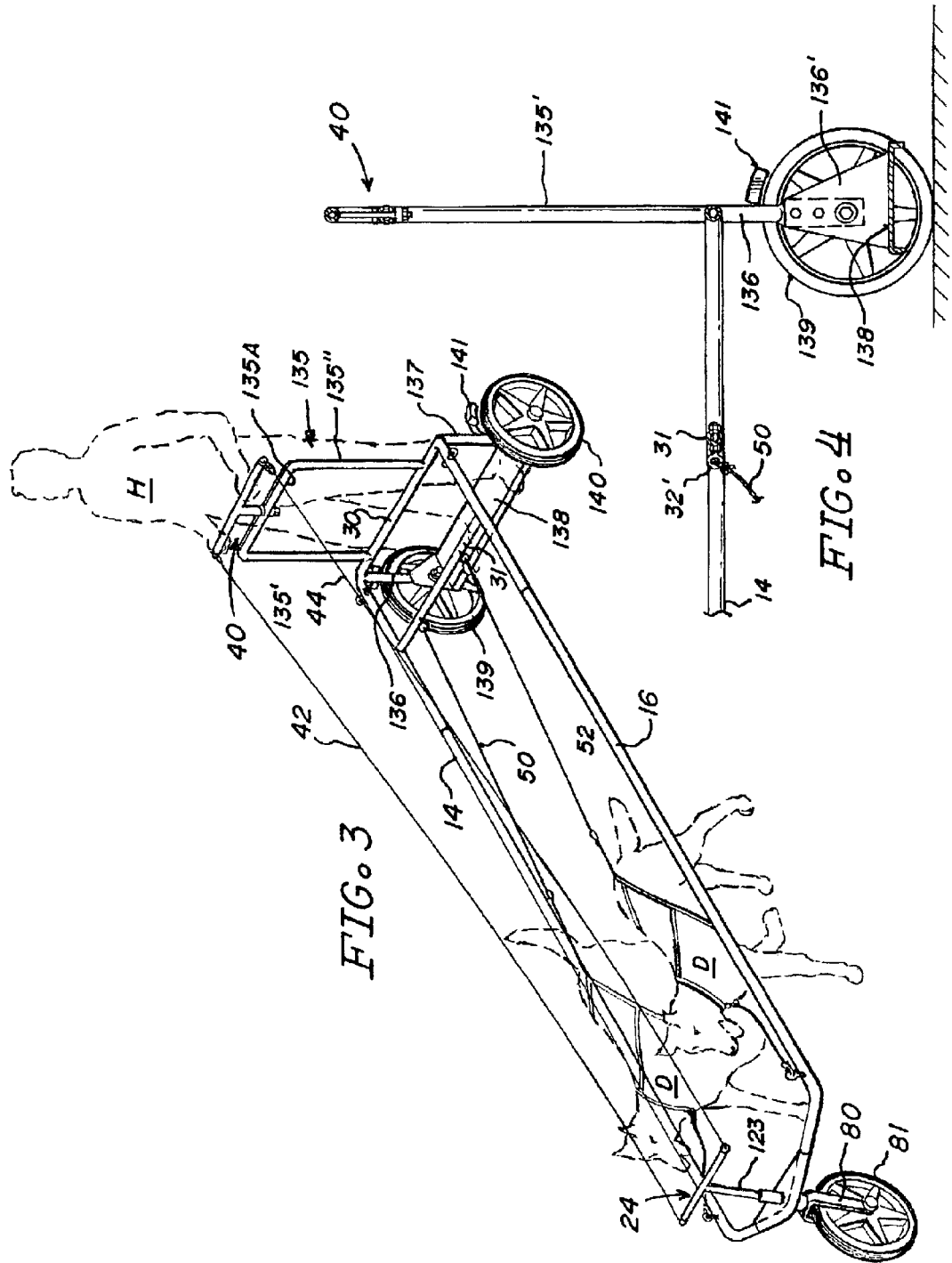

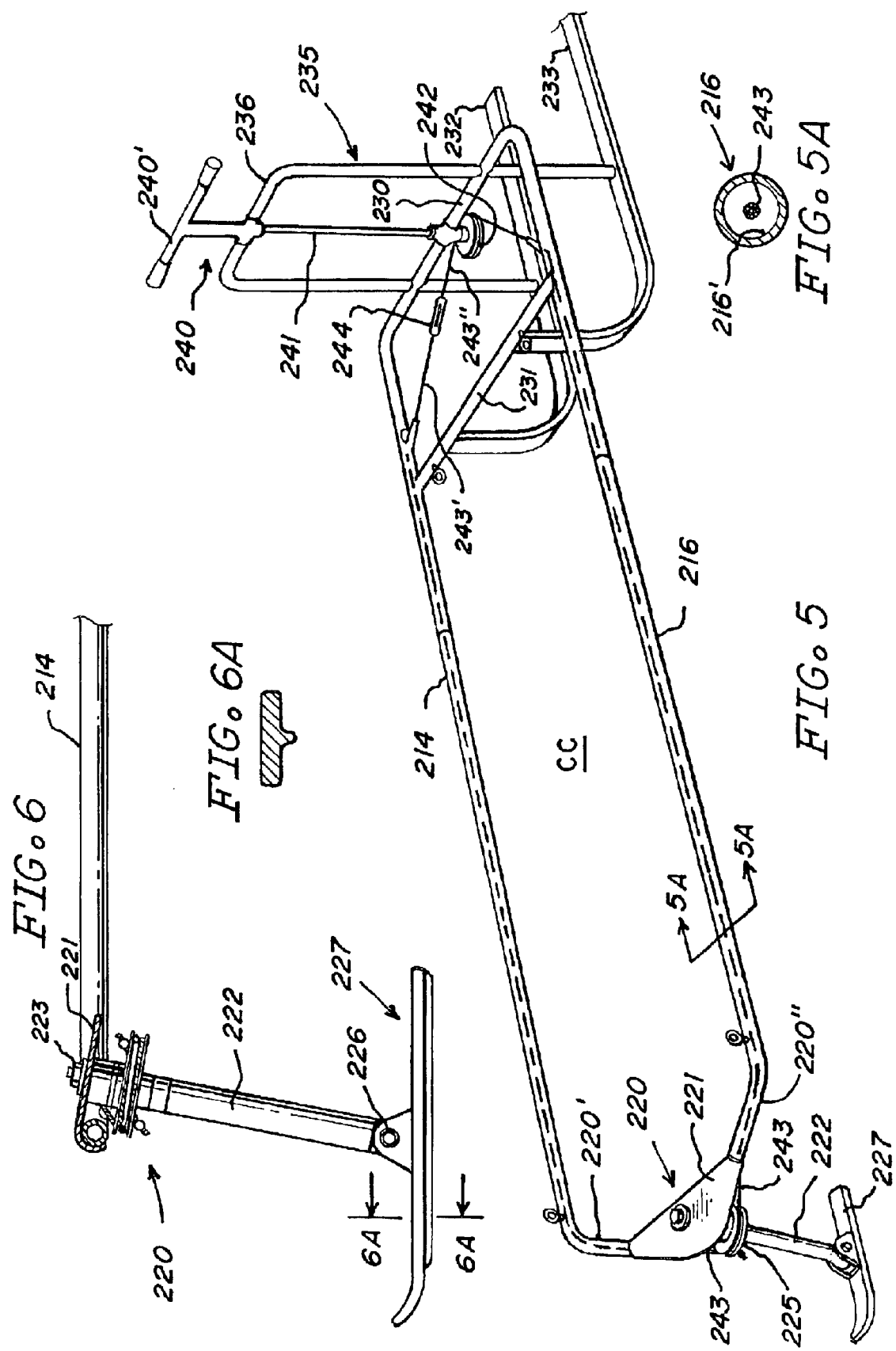

DOG-POWERED VEHICLE

BACKGROUND OF THE INVENTION AND DESCRIPTION OF PRIOR ART

The subject invention relates, in part, to the field of dog sledding which, in broad terms, is a centuries-old mode of transportation. An example would be the classical arrangement of having a sled-like device pulled by up to four or more sets of dogs, longitudinally spaced apart, with a human driver or operator usually at least sometimes riding on the sled and giving voice commands to a lead dog, to control the direction of travel, as well as starting and stopping. The sled is pulled by a rope called a gang line, one end of which is fastened to the front of the sled. The dogs are connected or tethered by short lines to the gang line at intervals along the gang line with the lead dog being connected to the other end of the line. Generally, eight feet of gang line is required for each set of two dogs. A typical prior art team of eight dogs (four sets of two) would extend approximately 32 feet out in front of a conventional sled. The prior art systems have a host of problems. Lines can get tangled. The dogs may end up fighting one another. The dogs may chew through their lines. In darkness, it may be difficult for the dogs and/or the driver to see the trail. Distractions for the dogs that may be encountered on the trail can end up in disaster, for example, domestic dogs guarding their own territory. A number of prior art arrangements and apparatus are shown in the Black Ice catalog of dog sledding equipment for the 2000–2001 sledding season, a publication of Black Ice, Inc., of New Germany, Minn. In generic terms, the present invention relates to dog sledding, carting, scootering, and skijoring.

The number one problem with dog sledding, carting, scootering, exercising, and skijoring is that, with gang lines, the driver does not have physical control over the direction of the dogs on the trail, or precise placement of the sled on the trail. Problems with gang lines include that the dogs can get entangled in the lines and with each other. The dogs are extended up to 32 feet (with an 8-dog team) out in front of the sled. This, among other things, makes it dangerous to cross public roads on a trail. This arrangement also makes it impossible to have a light out in front of the team when operating at night.

There can be little or no control over dogs that are not well trained when there are distractions on the trail. A rider cannot physically push the dog team past a distraction. It is necessary to have a very well trained lead dog. Voice commands alone are used to steer the lead dog and the dog team; the lead dog may or may not obey the commands. Although the rider can give commands for a general direction, the rider does not have precise control over the placement of the dogs and sled on the trail. Dogsleds are not generally allowed adjacent to cross-country ski trails because the operators cannot guarantee they will not cross the groomed ski trail and ruin it. Even with a well-trained dog team, other dogs, wild animals, and traffic can distract the team and become a safety issue. Also, it is possible for a moving sled to run into the dogs in front of the sled. So-called "weight pulling harnesses" for dogs cannot be used with the conventional gang line tethering.

Prior art lighting for the nighttime navigation of a team and sled consists typically of a headlamp worn by the driver, and blinking lights on the dog collar of the lead dog is sometimes mandatory in some long distance races. This arrangement is not fully satisfactory, especially with an eight-dog team, because the lead dog area receives, typically, inadequate illumination.

SUMMARY OF THE INVENTION

The present invention first of all provides a vehicle which, when used as a dog-powered sled for use on ice and snow, or as a dog cart, is not subject to the above-mentioned problems with the prior systems and apparatus. The invention comprises a frame structure defining a horizontally oriented opening within which at least one dog is intended to be positioned. The frame structure includes a pair of longitudinally extending frame members, each having a forward or front end and a rearward or back end. The frame members are nominally spaced apart a preselected transverse distance by forward transversely extending means connected to the forward ends of the frame members, and by rearward transversely extending means connected to the rearward or back ends of the frame members. The preselected transverse distance is always greater than the transverse width of at least one typical sled dog.

The frame structure is supported by a forward frame supporting means connected to the forward transversely extending means. The forward frame supporting means includes a steerable member adapted to have contact with the ground, i.e., either a ski or a wheel means.

The vehicle further includes a rearward or back frame supporting means connected to the rearward transverse means and adapted to have contact with the ground. The front and back, or forward and rearward frame supporting means collectively support the frame structure a preselected distance above the ground and parallel thereto.

A manually operable steering means is provided and is connected to the rearward transversely extending means and includes means connected to the steerable member to facilitate control of the steerable member to change direction of travel of the vehicle.

A means is provided for tethering the front, e.g., a collar, of a dog to the frame structure. Additionally, a means is provided for connecting a harness on the sled dog to the frame structure so that forward-directed longitudinal pulling force produced by the dog is applied to the frame structure.

As indicated above, the steerable member at the front part of the frame structure and the frame supporting means at the back end of the frame structure may be skis. For example, the steerable member may be a single ski which is rotatable about a vertical axis so as to steer the front of the frame structure. The supporting means at the rear of the frame structure may be a pair of spaced apart skis.

Alternately, the steerable member and the rearward frame supporting means may include wheel means. This facilitates the frame structure being used either in the wintertime on the snow, or during the rest of the year on hard surfaces such as streets and roads. One of the embodiments of the present invention provides wheel means which are attachable and detachable from the bottom surfaces of skis on a vehicle

DESCRIPTION OF THE DRAWING

FIG. 1 is a perspective view of a first embodiment AA of my invention, the drawing also depicting separate detachable wheel means 60 and 70 which may be attached respectively to the skis 27, 32, and 33 on the front and back of the vehicle.

FIG. 2 is a detail elevational showing of the back end of the vehicle of FIG. 1, with a wheel means 70 attached to the bottom of the ski 33.

FIG. 3 is a perspective view of a wheeled embodiment BB of my invention.

FIG. 4 is an elevational view of the rear end of the vehicle shown in FIG. 3.

FIG. 5 is a perspective view of another embodiment CC of my invention.

FIG. 5A is a cross-section of frame member 216 as viewed along section lines 5A—5A of FIG. 5.

FIG. 6 is an elevational showing front-end detail of the apparatus shown in FIG. 5.

FIG. 6A is a cross-section of the front of ski 227 as viewed along sections lines 6A—6A of FIG. 6.

DETAILED DESCRIPTION OF THE INVENTION

Figure 7:
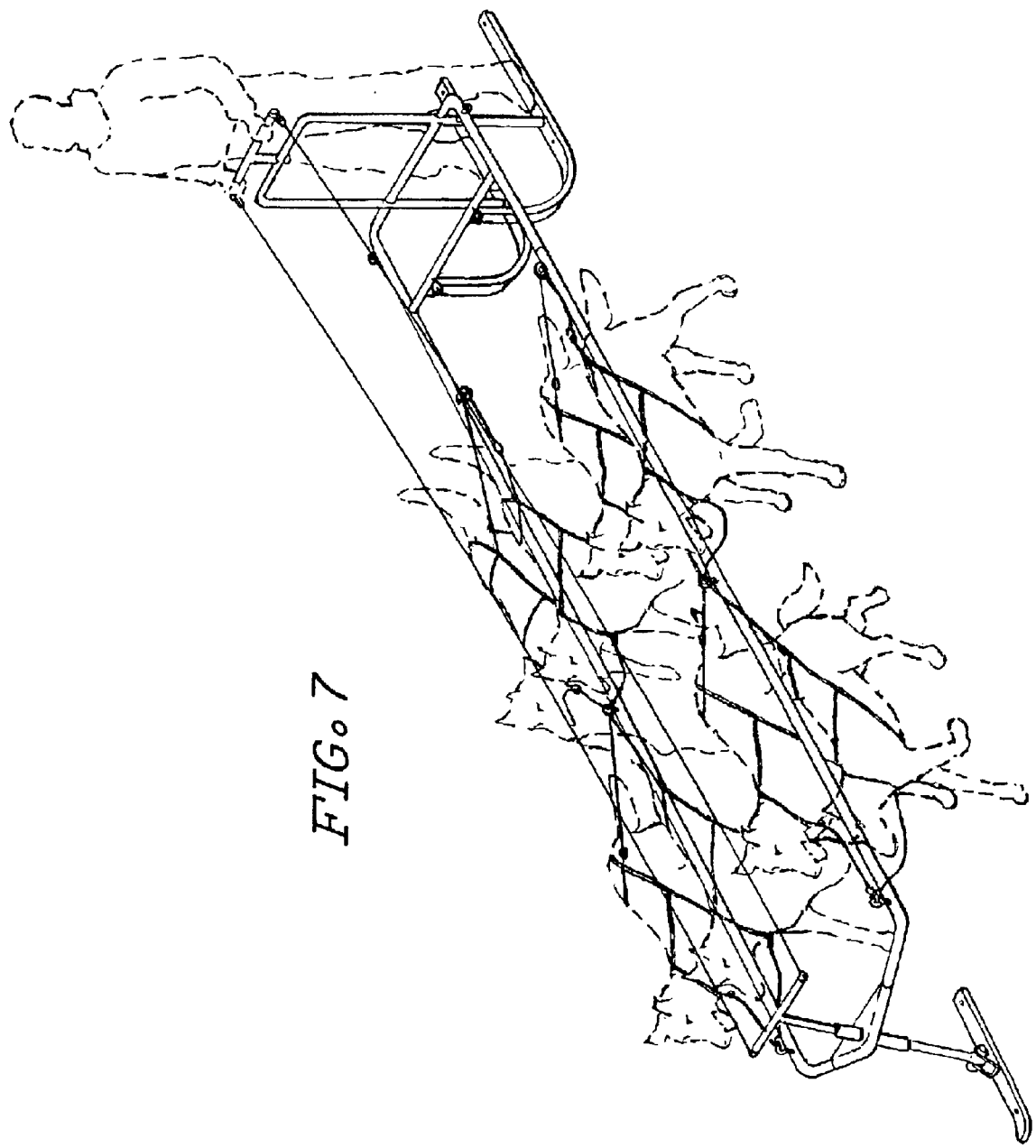
FIG. 7 is a perspective view of embodiment AA of my invention as configured with a team of eight dogs.

Referring to FIG. 1, a dog powered and human controlled sled or vehicle AA for traveling along the ground G as the result of a pulling force produced by at least one dog D and vehicle travel direction being under human control by a human H is depicted as comprising a frame structure 10 defining a generally rectangularly shaped and horizontally oriented opening 12. The frame structure 10 comprises a pair of longitudinally extending frame members 14 and 16 each having a forward end or front end shown at the left side of the figure, and a rearward or back end, the frame members 14 and 16 being nominally spaced apart a preselected transverse distance TD by forward transversely extending means 20 connected to the forward ends of the frame members and by rearward transversely extending means 30 and 31 connected to the rearward or back ends of the frame members 14 and 16. The forward and rearward transversely extending means 20 and 30 respectively may be extensions of the frame members 14 and 16. The frame structure can be fashioned from any suitable material such as aluminum or steel, have square, round, or other cross-section, and can be solid or hollow in cross-section. The preselected transverse distance TD is selected so as to be greater than the transverse width of at least one dog D. As depicted in FIG. 1, the transverse distance TD is preselected so that two dogs can be positioned within the frame. On the right side of FIG. 1 is depicted three mutually perpendicular reference axes: a longitudinal axis LA pointing in the direction of the frames 14 and 16, a transverse axis TA, and a vertical axis VA. Thus the frame members 14 and 16 may be described as longitudinally extending. The rear members 30 and 31, which are spaced apart, both extend in a transverse sense. The LA and TA axes can be considered to lie in a plane parallel to the ground G. The longitudinal axis LA is an indicator of forward movement of the sled AA. The vertical axis VA is a reference for the turning of the sled AA away from a first heading to a new heading.

A forward frame supporting means 21 is connected to the forward transversely extending means 20 and includes a steerable member or ski 27 which is adapted to have contact with the ground, i.e., snow or ice. More specifically, the forward frame supporting means 21 comprises a sleeve 22 having a substantially vertical axis and is centrally positioned in a bracket connected to portions 20' and 20" of the forward transversely extending means 20. The sleeve 22 provides a housing for rotatably and vertically supporting a shank 23 of a T-shaped member 24. The top portion 24A of member 24 is connected at its midpoint to the top of member 23 and the two outer ends of which, 24' and 24", have means thereon for attachment to control lines 42 and 44 respectively, to be discussed below. The aforesaid ski 27 is attached to the bottom of member 23 through a suitable coupling 26.

The rearward frame supporting means comprises a pair of skis 32 and 33, transversely spaced apart and having a forward facing curved surface terminating in ends 32' and 33', which may have suitable connections to cross brace 31. The trailing ends of the skis 32 and 33 are respectively 32" and 33". A U-shaped bracket 35 has a pair of vertically oriented, spaced-apart members 35' and 35" attached at their lower extremities to the top surfaces of the skis 32 and 33 as at 32'" and 33'"; the vertically oriented members 35' and 35" may also be connected to the transverse extending member 30, as at 30' and 30". The members 35' and 35" are connected at the tops thereof by a cross brace 35'".

Manually operable steering means 40 includes a T-shaped handle having a vertical portion 40' journaled for rotation in the cross brace 35'" of the member 35. The T-shaped handle has a top with two portions extending transversely from the central vertical portion 40' terminating at 40" and 40'". A first control line 42 is connected between end 40'" of the steering means 40 and the end 24' of the member 24 operatively connected to the steerable member, i.e., ski 27. A second control line 44 is connected from end 40" to end 24". Thus a human operator H which may (as shown in FIG. 1) conveniently stand on the top of skis 32 or 33, or on a separate supporting platform not shown, to control the rotational movement of ski 27 about its vertical axis by rotation of the T-shaped handle 40 which, by being connected via lines 42 and 44, will control the angular position of the T-shaped handle 24, and thus change the heading (about the vertical axis) of the sled AA.

It will be noted that both dogs depicted in FIG. 1 have, on their necks, a collar-like means DC which are connected or tethered by tethers 46 and 47 to appropriate connecting means 46' and 47' which are attached to and integral with frame members 14 and 16. Each dog also is depicted as wearing a dog harness DH which may be the type known in the art as a weight-pull harness; such harnesses are respectively connected by lines 50 and 52 attached to connections 32' and 33' of the cross linkage 31 of the basic frame structure. Thus the forward directed longitudinal pulling force produced by the dogs is directly applied to the frame structure and thus pulls the vehicle forward in the longitudinal direction. If the operator H wants to change the direction of travel of the vehicle, the operator merely rotates the handle means 40, which thus rotates the ski 27 about its vertical axis, and the vehicle is thus turned. It will be appreciated that the prior art trained lead dog function has been eliminated.

Also shown in FIG. 1 is a wheel means 60 and 70 which may be respectively attached to the underside of the skis 27, and 32 and 33 (two of units 70), to provide a quick and easy means for converting a wintertime vehicle to a summertime vehicle FIG. 2 depicts the rear end of the vehicle shown in FIG. 1, and shows a foot brake means 80 which may be selectively operated by the human H to stop forward movement of the sled AA. The brake means 80 comprises a lever 81 pivotally attached at 82 to member 35" with a pad or equivalent 83 at the end of lever 81 adapted to contact ground G when rotated by the foot of the operator H.

Referring now to FIG. 3, another embodiment BB of my invention is depicted comprising a vehicle with a basic frame structure very similar to that shown in FIG. 1. The primary difference between these embodiments is that the vehicle shown in FIG. 3 has a wheel 81 at the front end, and a pair of wheels 139 and 140 at the back end. The wheel 81 is supported on a fork 80 which is connected at the bottom end of a shaft 123 having a handle 24 at the top thereof. The human operator may stand on a platform 138, shown also in FIG. 4, and again has a T-shaped operating steering means 40 connected by lines 42 and 44 to the two ends of the horizontal portion of member 24. The T-shaped handle 40 is supported in the central portion 135A of a U-shaped member 135 having a pair of downwardly extending, vertically oriented, spaced-apart members 135' and 135" which are connected to the cross brace 30, the ends of which have vertical downwardly extending portions 136 and 137 connected to provide support for the platform 138 and also to provide journals for the wheels 139 and 140. Two dogs are shown harnessed therein, and are connected by lines 50 and 52 to the cross brace 31 so as to cause, as aforesaid, forward motion to the vehicle.

Again, the driver/operator H may use a braking means 141 positioned proximate to the periphery of wheels 139 and 140 to stop and hold the vehicle BB from longitudinal movement.

The driver H can control the steering of the vehicle BB via turning the steering means 40 to thus rotate the fork 80 and front wheel 81 about the vertical axis thereof;

Another embodiment of my invention is vehicle CC depicted in FIG. 5, which has a hidden cable steering system. The basic functionality of the vehicle is similar to the embodiments AA and BB in that the human operator H may control the angular position of the forward ski or wheel to control the direction of the moving vehicle. The main difference is to have hollow frame members 214 and 216 as conduits for carrying a cable 243, shown best in FIG. 5A. In brief terms, frame portions 214 and 216 are spaced apart the desired preselected transverse distance by a forward transverse extending means 220 having portions 220' and 220" joined and coupled to a forward frame supporting means 221 supporting a shaft 222 rotatable about its vertical axis and having attached at the bottom therein a ski 227. A pulley means 225 is also connected to the member 222 and receives the cable 243 wrapped around, in a manner well understood by those skilled in the art, so that movement of cable 243 inside of the vehicle frame will cause rotation of member 222 about its vertical axis.

Another pulley member 242 is connected at the bottom end of member 241 of the manually operable steering means 240. Again, the cable is wrapped around the pulley means 242 in the well known manner. The two ends of the cable 243' and 243" are depicted in FIG. 5 as being connected to a cable tension tightener means such as a turnbuckle 244 for maintaining the proper tension in the cable.

FIG. 6 shows a side view of the front portion of the vehicle with the member 222 supporting the ski 227 through a pivotal connection 226.

One additional feature shown in FIG. 6 is that the ski 227 may have a vertically downward extending rib. This rib or fin can be advantageous, in snow and/or ice, for increasing the effectiveness of the turning action of the ski 227 when it is rotated under the influence of the steering means 240.

FIG. 7 is a depiction of the invention as utilized with a team of eight dogs arranged to pull the vehicle. For reference, FIG. 1 showed two dogs arranged as a set in side-by-side relationship. FIG. 7 shows, within the framework, two sets of dogs in side-by-side relationship, the sets of dogs being longitudinally spaced apart. In other words, one set of dogs is up near the front of the vehicle, and the other set of dogs is positioned closer to the rear of the vehicle. The spacing between the dogs is selected for providing adequate running of the dogs without interference between the dogs. A rule of thumb is to have each set of two dogs longitudinally spaced about two feet away from the other sets of dogs. Then in FIG. 7, two additional dogs are provided on the left or port side of the frame, and two dogs are added on the right or starboard side of the frame.

This arrangement shown in FIG. 7 is very advantageous because the power of eight dogs is available for pulling the sled or vehicle, and yet the total longitudinal length for this configuration is no more than approximately 15 feet. By contrast, a prior art team of eight dogs all pulling on the same gang line would require roughly 32 feet. As indicated, the normal longitudinal spacing is eight feet between sets of dogs.

Figures 8, 9:
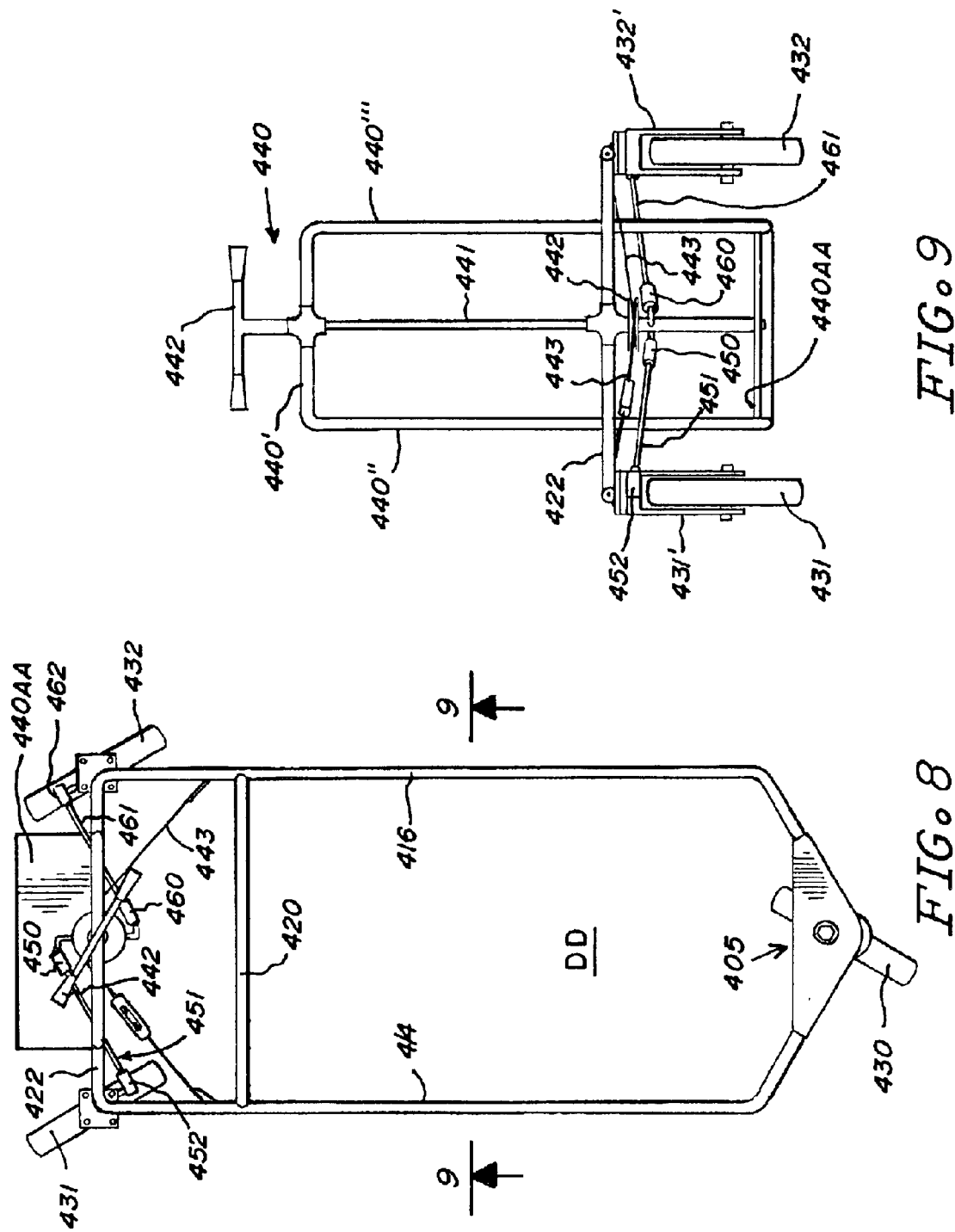
FIG. 8 is a plan view of another embodiment of my invention.
FIG. 9 is an elevational view of the back end of the embodiment shown in FIG. 8 as viewed along sections 9—9 of FIG. 8.

The embodiment shown in FIGS. 8 and 9 is designated DD and has the primary distinction over the other embodiments by having a very small or even zero turning radius by having the rear wheels 431 and 432 pivoted and controlled so as to rotate about their vertical axes in sense opposite to the sense of rotation of the front wheel 430 about its vertical axis. This embodiment is depicted with having a hollow frame member serving as a conduit for the cable, but it will be understood that the external cabling arrangement as shown in FIG. 1 could also be used with this basic concept of the short or zero turning radius.

Thus a pair of frame members 414 and 416 are provided with a pair of transverse members 420 and 422 near the back end thereof for transverse spacing and stability, as well as a front transverse extending means 405 for maintaining the spacing between the frame members, as well as providing a support for the front wheel 430. As was the case for embodiment CC shown in FIG. 5, the front wheel is steered as a function of rotation of the steering bar 442 of the manually operable steering means 440. More specifically, a U-shaped member having a bite portion 440' and two downwardly extending members 440" and 440'" which support at the very base thereof a support platform 440AA for supporting a human operator.

Again, a pulley or sleeve 442 is attached to the member 441 to rotate therewith and wrapped around it is the cable 443 which travels through the frame members 414 and 416 so as to control the angular position of the front wheel 430 in a manner analogous to the control of the ski 227 in the embodiment shown in FIG. 5.

The rotatable shaft 441 also has attached thereto a mechanism linked to the rear wheels 431 and 432 so as to cause them to be rotated about their vertical axes simultaneously but in a sense opposite to the sense of rotation of the front wheel 430. This means includes the wheels 431 and 432 respectively being housed in forks 431' and 432', which are on swivel bearings so that they may rotate about their vertical axes. The top portions of the forks 431' and 432' are connected via tie rods 451 and 461 to a ball joint means 450 and 460 respectively. The tie rods 451 and 461 are connected to the swivel or forks 431' and 432' as at 452 and 462 respectively.

In summary, the present invention provides a dog-powered and human controlled vehicle which is immune from the above-noted problems which plague the prior art vehicles. For example, the dogs are constrained by being directly tethered to the frame structure. A headlight means may be mounted on the front of the sled to efficiently light the way for the vehicle at night. The prior art sleds cannot use such a light because it would tend to illuminate the rear ends of the dogs and to cast forward-extending shadows ahead of the dogs, which can adversely disturb the dogs' perception of the terrain. In some cases, this factor can cause the dogs to slow up or become injured.

Further, the turning of the vehicle is under the direct control of the driver and, because the dogs are tethered directly to the frame, the dogs are automatically caused to follow the turning vehicle. No longer is the turning dependent on having a lead dog hearing, and acting upon, a voice command Dog infighting is minimized.

If necessary, a driver can push to move the vehicle, and the dogs, past a distraction.

While the preferred embodiment of the invention has been illustrated, it will be understood that variations may be made by those skilled in the art without departing from the inventive concept. Accordingly, the invention is to be limited only by the scope of the following claims.

What is claimed is:

1. A dog powered and human controlled vehicle adapted to be attached to, and powered for forward motion thereof, on the ground, by at least one dog on the ground, said vehicle comprising:
   a. a frame structure defining an opening sized and adapted for the positioning therein of at least one dog on the around, said frame structure having (i) a pair of spaced-apart longitudinally extending frame members each having a forward end and a rearward end, and (ii) means respectively connected to said forward ends and rearward ends of said frame members to space said frame members apart a preselected transverse distance,
   b. a forward frame supporting means connected to said means connected to said forward ends of said frame members and including a steerable member adapted to have contact with the ground,
   c. a rearward frame supporting means connected to said means connected to said rearward ends of said frame members and adapted to have contact with the ground, said forward and rearward frame supporting means being adapted to support said frame structure a preselected distance above the ground,
   d. manually operable steering means (i) connected to said means connected to said rearward ends of said frame member and (ii) including means connected to said steerable member to control the direction of travel of said vehicle,
   e. means on said frame structure adapted to be a tethering means to the front of a dog positioned in said opening, and
   f. means on said frame structure adapted to be a connection means to a dog harness on a dog positioned in said opening;

whereby (i) said vehicle may be moved longitudinally forward with respect to the ground by pulling force of a dog adapted to be positioned within said opening and having a dog harness adapted to be connected to said means on said frame structure adapted to be a connection means to a dog harness, and (ii) said vehicle may be steered about a vertical axis by manual actuation of said manually operable steering means at said rearward end of said frame structure to control said steerable member at said forward end of said frame structure.

2. The vehicle of claim 1 wherein said steerable member and said rearward frame supporting means are skis.

3. The vehicle of claim 2 including detachable wheel means connected to said skis.

4. The vehicle of claim 1 wherein said steerable member is a single ski and said rearward frame supporting means are a pair of spaced apart skis.

5. The vehicle of claim 4 further including wheel means connected to said single ski and to said pair of spaced apart skis.

6. The vehicle of claim 4 wherein said single ski has a fin depending from the lower surface thereof.

7. The vehicle of claim 1 wherein said steerable member and said rearward frame supporting means include wheel means.

8. The vehicle of claim 7 wherein said wheel means of said rearward frame supporting means are transversely spaced apart and are controllable about respective vertical axes.

9. The vehicle of claim 8 wherein said wheel means are connected to said manually operable steering means and are adapted to rotate about said vertical axes in a sense opposite to the controlled rotation of said steerable member about its vertical axis.

10. The vehicle of claim 1 wherein said steerable member and said rearward frame supporting means includes wheel means.

11. The vehicle of claim 1 including means at said rearward ends of said frame members for supporting a human rider/operator.

12. The vehicle of claim 1 including means at said rearward ends of said frame members for selectively braking forward longitudinal movement of said vehicle.

13. The vehicle of claim 1 wherein said opening has a preselected longitudinal length and a preselected transverse width adapted to accommodate a set of two dogs positioned in side-by-side relationship.

14. The vehicle of claim 1 wherein said opening is sized and adapted to accommodate therein two longitudinally spaced apart sets of pairs of dogs positioned in side-by-side relationship.

15. The vehicle of claim 14 including means connected to said frame members adapted to be connected to a plurality of additional dogs positioned outside of said frame structure.

16. The vehicle of claim 1 including means connected to said frame members adapted to be attached to at least one additional dog, positioned outside of said frame structure.

17. The vehicle of claim 1 wherein said longitudinally extending frame members are hollow and said means for controlling said steerable member includes cable means positioned within said hollow frame members.

18. The vehicle of claim 1 wherein said manually operable steering means includes a rotatable member and said means connected to said steerable member includes cable means connected to said rotatable member.

19. The vehicle of claim 1 wherein said longitudinally extending frame members are spaced apart in substantially parallel relationship.

* * * * *